Jan. 1, 1924

C. BRAMMING

GREASE GUN

Filed Jan. 19, 1922

1,479,219

Inventor;
Carl Bramming
By Nelson Nelson
Attorneys.

Patented Jan. 1, 1924.

1,479,219

UNITED STATES PATENT OFFICE.

CARL BRAMMING, OF CHICAGO, ILLINOIS, ASSIGNOR TO ACCESSORIES MANUFACTURING COMPANY, A CORPORATION OF ILLINOIS.

GREASE GUN.

Application filed January 19, 1922. Serial No. 530,341.

*To all whom it may concern:*

Be it known that I, CARL BRAMMING, a citizen of the United States, and resident of Chicago, county of Cook, and State of Illinois, have invented certain new and useful Improvements in Grease Guns, of which the following is a specification, and which are illustrated in the accompanying drawings, forming a part thereof.

The invention relates to devices commonly known as grease guns, which are adapted to deliver, under pressure, a lubricant such as grease or oil. Such devices as heretofore known have taken the general form of a syringe, comprising a barrel and a reciprocating plunger, the plunger being advanced by means of a stem rigidly secured to it and in threaded engagement with a nipple or nut mounted upon the end of the barrel. A gun thus organized has the disadvantage that the operating stem must project from the barrel, substantially its entire length, when the gun is charged, and inasmuch as it sometimes becomes necessary to apply a great force the stem is liable to be bent and render the instrument useless.

The present invention comprises a barrel within which reciprocates a non-rotatable plunger advanced by a stem in threaded engagement with it, and which is held against axial movement.

In the accompanying drawings illustrating the invention—

Figure 1:
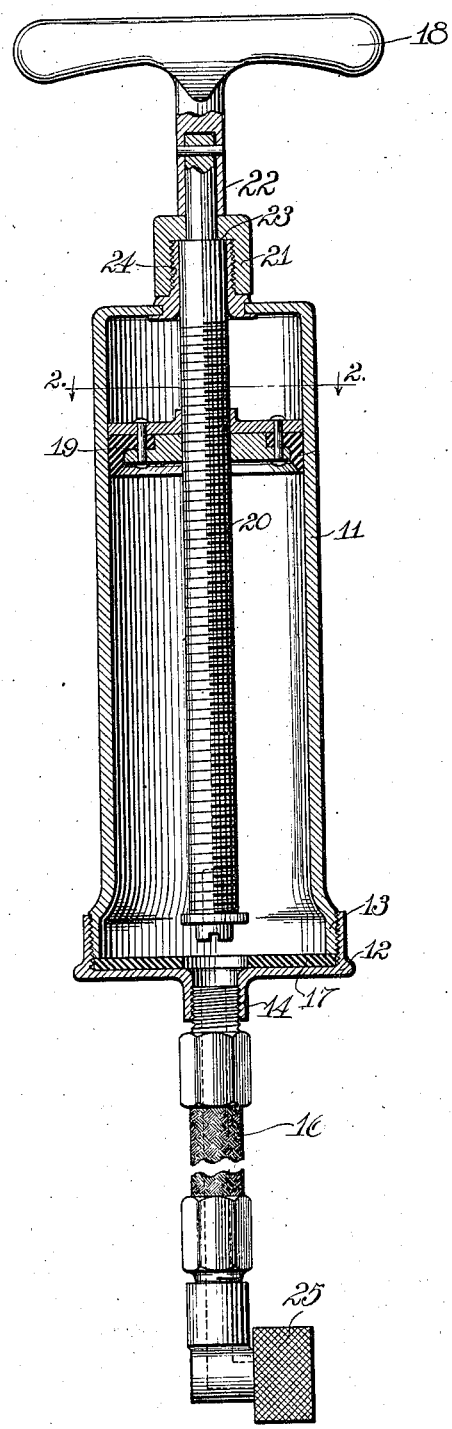
Figure 2:
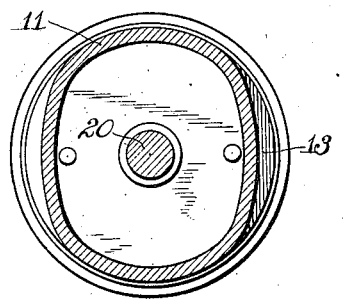

Fig. 1 is a detail longitudinal central section of the gun, some parts being shown in elevation; and Fig. 2 is a transverse section on the line 2—2 of Fig. 1.

In the embodiment of the invention as shown in the drawings, the barrel 11 of the gun is oval in cross-section except at its delivery end where a short portion, 13, is given a cylindrical form. The plunger 19 is complementary in its peripheral form to the oval portion of the barrel, and is free to reciprocate therein but is securely held against rotative movement.

The operating stem 20 enters through the rearward end of the barrel, passing entirely through and being in threaded engagement with the plunger. The outer end of the stem is of reduced diameter, thus providing an annular shoulder 23 upon which is seated a retaining cap 21, in threaded engagement with a nipple 24 rigidly secured to the barrel. A handle 18, having a tubular shank 22, is sleeved upon and pinned to the projecting end of the stem 20, the end of the shank seating against the outer face of the cap 21, and with the shoulder 23 securely holding the stem 20 against axial movement.

The delivery end 13 of the barrel is exteriorly threaded for the application thereto of a closing cap 12, within which is preferably seated a gasket 17. The cap 12 is provided with a suitable nipple 14, to which is secured a delivery tube 16 shown as being provided with a nipple 25, adapted for attachment to a bearing or to the nipple of a grease cup, such as that forming the subject of my copending application Serial No. 530,342, filed January 19th, 1922.

The barrel of the gun may be charged by rotating the stem 20 in a direction to withdraw the plunger, where the lubricant is a liquid, or by unscrewing the cap 12 if the lubricant is in the form of grease. The rotation of the stem 20 in a suitable direction will advance the plunger and discharge the lubricant under such pressure as it may be desirable or necessary to apply to it, and by using on the stem a thread of small pitch a high degree of pressure may be attained. The oval form of the barrel not only insures the non-rotation of the plunger but prevents turning in the hand of the user.

Various changes in detail may be made without departing from the scope of the invention, as, for example, one of the objects of the invention will be attained by the use of any means for so interlocking the plunger with the barrel as to prevent their relative rotation.

I claim as my invention—

1. In a grease gun, the combination of a barrel of oval cross section, a delivery cap detachably connected with one end of the barrel, a threaded stem swiveled in the opposite end of the barrel and extending longitudinally therein, a plunger non-rotatably mounted within said barrel and engaged with said stem.

2. In a grease gun, the combination of a barrel of out of round cross section and having one closed end, a substantially cylindrical threaded extension adjacent to the opposite end, a delivery cap secured to said threaded extension, a threaded stem swiveled in the closed end, and extending longitudinally in the barrel, and a plunger engaged with said stem and slidable in the barrel.

3. In a grease gun, the combination of a barrel of out of round cross section, having a round, threaded portion adjacent to its delivery end, a threaded cap engaged therewith, a threaded stem swiveled in the opposite end of the barrel, a plunger engaged with said stem and slidable in the said barrel, and a handle for operating said stem.

4. In a grease gun, the combination of a barrel having a closed end provided with a threaded nipple extending outwardly therefrom and a delivery end equipped with a detachable cap, a plunger slidably mounted in the barrel, a threaded stem engaging said plunger and having a smooth portion journaled in said nipple and terminating in a shoulder at the end of the nipple, a cap threaded on said nipple and having a flange resting against said shoulder, and a handle secured to the end of the stem and bearing on said cap.

CARL BRAMMING.